United States Patent
Songa et al.

(10) Patent No.: US 11,676,499 B2
(45) Date of Patent: Jun. 13, 2023

(54) METHODS AND SYSTEMS FOR ALERTING A VISUAL DESCENT POINT (VDP)

(71) Applicant: HONEYWELL INTERNATIONAL INC., Charlotte, NC (US)

(72) Inventors: Anil Kumar Songa, Bangalore (IN); Kantha Chikkegowda, Bangalore (IN); Suresh Bazawada, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/397,423

(22) Filed: Aug. 9, 2021

(65) Prior Publication Data
US 2022/0406204 A1    Dec. 22, 2022

(30) Foreign Application Priority Data
Jun. 17, 2021    (IN) ............................ 202111027025

(51) Int. Cl.
| | |
|---|---|
| G08G 5/04 | (2006.01) |
| B64D 43/00 | (2006.01) |
| B64D 45/04 | (2006.01) |
| B64D 45/00 | (2006.01) |

(52) U.S. Cl.
CPC ............. *G08G 5/045* (2013.01); *B64D 43/00* (2013.01); *B64D 45/04* (2013.01); *B64D 2045/0075* (2013.01)

(58) Field of Classification Search
None
See application file for complete search history.

(56) References Cited

U.S. PATENT DOCUMENTS

| | | | | |
|---|---|---|---|---|
| 5,420,582 A | * | 5/1995 | Kubbat | G01C 23/005 340/975 |
| 6,445,310 B1 | * | 9/2002 | Bateman | G01C 5/005 340/963 |
| 6,980,892 B1 | * | 12/2005 | Chen | G05D 1/0676 701/16 |
| 7,084,785 B2 | * | 8/2006 | Rouquette | G05D 1/0676 701/16 |
| 7,640,082 B2 | * | 12/2009 | Dwyer | G01C 23/00 701/14 |
| 7,647,140 B2 | * | 1/2010 | Demortier | G05D 1/0676 701/16 |
| 8,019,491 B1 | * | 9/2011 | McCusker | G08G 5/0021 340/963 |
| 8,112,188 B2 | * | 2/2012 | Rouquette | G08G 5/0021 340/948 |
| 8,234,058 B1 | * | 7/2012 | Barber | G08G 5/025 701/120 |

(Continued)

*Primary Examiner* — Fekadeselassie Girma
(74) *Attorney, Agent, or Firm* — Lorenz & Kopf LLP

(57) ABSTRACT

Methods and system for alerting a Visual Decent Point (VDP) in an aircraft system. The methods and systems retrieve runway altitude data and Minimum Descent Altitude (MDA) data from an avionics database for a target runway. Data in the avionics database for the target runway does not include a published VDP. The method includes calculating the VDP based on a difference between the runway altitude data and the MDA so as to achieve a target downward acceptable glidepath angle during final descent from the MDA to the target runway. The method includes outputting an alert of the VDP by an output device of the aircraft system.

18 Claims, 6 Drawing Sheets

(56) References Cited

U.S. PATENT DOCUMENTS

| | | | |
|---|---|---|---|
| 8,712,609 B2* | 4/2014 | Kadavil | G09G 5/00 |
| | | | 701/16 |
| 9,188,978 B2* | 11/2015 | Sacle | G08G 5/003 |
| 9,189,963 B2* | 11/2015 | Iraudo | G08G 5/02 |
| 2013/0304284 A1* | 11/2013 | Kadavil | G06F 3/147 |
| | | | 701/16 |
| 2014/0222257 A1* | 8/2014 | Wyatt | G08G 5/0021 |
| | | | 701/16 |
| 2021/0012671 A1* | 1/2021 | Roger | G08G 5/025 |
| 2021/0123770 A1* | 4/2021 | Martin | G08G 5/025 |

* cited by examiner

METHODS AND SYSTEMS FOR ALERTING A VISUAL DESCENT POINT (VDP)

CROSS REFERENCE TO RELATED APPLICATION

The present application claims benefit of prior filed Indian Provisional Patent Application No. 202111027025, filed Jun. 17, 2021, which is hereby incorporated by reference herein in its entirety.

TECHNICAL FIELD

The subject matter described herein relates to alerts provided to flight crew based on a calculated visual descent point.

BACKGROUND

When flying under Instrument Flight Rules (IFR), there are three types of terminal instrument procedures (TERPS) or instrument approach procedures (IAPs) that can be used during an instrument landing. There are Precision Approach (PA), Approach with Vertical Guidance (APV) and Non-Precision Approach. Pilots flying a precision instrument approach have both course and glidepath deviation data to guide them to a touch down point on the runway.

For executing a non-precision approach, some potential dangers include: diving too steeply and being unable to pull up to level off, hitting an obstacle or terrain while descending, going below the minimum descent altitude (MDA) too soon, and landing beyond the safe touch down point.

The visual descent point (VDP) is a reference point used by pilots when flying a non-precision instrument landing. This point lies at the minimum descent altitude (MDA) and indicates the position from which the pilot can begin a final descent for landing provided that the pilot is in a position to land, has the necessary visibility, and has acquired visual references with the runway environment. A continuous rate of descent from the VDP to the touchdown point will usually set the pilot up with the same 3-degree glideslope used by pilots flying a precision approach.

If published, the Visual Descent Point (VDP) is identified with a "V" on the vertical profile of many approach plates (charts). VDP is not published for all the approaches. If VDP is not published, pilots can calculate VDP manually, which consumes pilots time, increases pilot's workload and can induce human errors in calculations. During execution of calculated VDP, the pilot needs to consider avoiding obstacles, terrain and needs to plan to land appropriately at the touch down point to avoid runway overrun.

The Federal Aviation Authority (FAA) instructs pilots to avoid descending below the Minimum Descent Altitude (MDA) until they have reached the Visual Descent Point. This helps to minimize the risk of impacting terrain and obstacles due to an early descent.

Accordingly, it is desirable to provide methods and systems supporting guidance for a pilot for non-precision approaches when the VDP is not published. Furthermore, other desirable features and characteristics of the present invention will become apparent from the subsequent detailed description and the appended claims, taken in conjunction with the accompanying drawings and the foregoing technical field and background.

BRIEF SUMMARY

In one aspect, a method is provided for alerting a Visual Decent Point (VDP) in an aircraft system. The method includes retrieving, via a processor, runway altitude data and Minimum Descent Altitude (MDA) data from an avionics database for a target runway, wherein data in the avionics database for the target runway does not include a published VDP. The method includes calculating, via the processor, the VDP based on a difference between the runway altitude data and the MDA so as to achieve a target downward acceptable glidepath angle during final descent from the MDA to the target runway. The method includes outputting, via the processor, an alert of the VDP by an output device of the aircraft system.

In embodiments, outputting the alert includes displaying a VDP symbology on an aircraft display that depicts an indication of a flight plan path.

In embodiments, outputting the alert includes displaying a VDP symbology on a vertical or lateral map display that depicts an indication of a flight plan path. The VDP symbology may be included on other types of displays including perspective, heads-up displays (HUD), etc.

In embodiments, the target downward acceptable glidepath angle is about 3°.

In embodiments, the retrieving further includes retrieving an offset distance between an end of the runway and a target touchdown location on the runway. The calculating is further based on the offset distance.

In embodiments, the method includes determining a final descent flight path during final descent based on the VDP, the target acceptable glidepath angle and aircraft position. The method includes retrieving, via the processor, terrain and obstacle data for the final descent from a Terrain and Obstacle Database. The method includes determining any intersection between the final descent flight path during final descent and terrain or obstacles described in the terrain and obstacle data including a clearance factor. The method further includes outputting, via the processor, an obstacle or terrain alert during the final descent based on any determined intersection.

In embodiments, the method includes determining, via the processor, a final descent flight path during final descent based on the VDP, the target acceptable glidepath angle, aircraft position and runway orientation. The method includes determining any deviations outside of a defined acceptable range from the final descent flight path based on sensed aircraft position. The method includes outputting a deviation alert based on the deviations. In embodiments, the deviations include lateral and vertical deviations.

In embodiments, the avionics database includes a navigation and charts database, a runway awareness database, an airport mapping database, etc.

In embodiments, the method includes receiving, via the processor, a distance from the target runway from Distance Measuring Equipment (DME). The method includes calculating, via the processor, a distance to the target runway based on a difference between the runway altitude data, the MDA and the target downward acceptable glidepath angle during final descent from the MDA to the target runway. The method further includes outputting, via the, the alert based on a comparison of the calculated distance and the received distance.

In another aspect, a system is provided for alerting a Visual Decent Point (VDP) in an aircraft. The system includes an output device and a processor in operable communication with the output device, the processor configured to execute program instructions, wherein the program instructions are configured to cause the processor to perform steps as follows. Retrieve runway altitude data and Minimum Descent Altitude (MDA) data from an avionics database for a target runway. Data in the avionics database for the target runway does not include a published VDP. Calculate the VDP based on a difference between the runway altitude data and the MDA so as to achieve a target downward acceptable glidepath angle during final descent from the MDA to the target runway. Output an alert of the VDP by the output device of the aircraft system.

In embodiments, output of the alert includes displaying a VDP symbology on an aircraft display that depicts an indication of a flight plan path.

In embodiments, output of the alert includes displaying a VDP symbology on a vertical or lateral map display that depicts an indication of a flight plan path. The VDP symbology may, additionally or alternatively, be included as a graphical augmentation of a HUD display or a perspective display, which may also include a graphical augmentation of a flight plan path indication.

In embodiments, the target downward acceptable glidepath angle is about 3°.

In embodiments, the retrieving further includes retrieving an offset distance between an end of the runway and a target touchdown location on the runway. The calculating is further based on the offset distance.

In embodiments, the program instructions are configured to cause the processor to performing the following steps. Determine a final descent flight path during final descent based on the VDP, the target acceptable glidepath angle and aircraft position. Retrieve terrain and obstacle data for the final descent from a Terrain and Obstacle Database. Determine any intersection between the final descent flight path during final descent and terrain or obstacles described in the terrain and obstacle data including a clearance factor. Output an obstacle or terrain alert during the final descent based on any determined intersection.

In embodiments, the program instructions are configured to cause the processor to perform the following steps. Determine a final descent flight path during final descent based on the VDP, the target acceptable glidepath angle, aircraft position and runway orientation. Determine any deviations outside of a defined acceptable range from the final descent flight path based on sensed aircraft position. Output a deviation alert based on the deviations. In embodiments, the deviations include lateral and vertical deviations.

In embodiments, the avionics database is a navigation and charts database, a runway awareness database, an airport mapping database, etc.

In embodiments, the program instructions are configured to cause the processor to perform the following steps. Receive a distance from the target runway from Distance Measuring Equipment (DME), Calculate a distance to the target runway based on a difference between the runway altitude data, the MDA and the target downward acceptable glidepath angle during final descent from the MDA to the target runway, and Output the alert based on a comparison of the calculated distance and the received distance. The distance to the target runway can, alternatively to be received from DME, be calculated based at least on Runway Position from the avionics database, runway altitude, runway bearing, aircraft position, aircraft altitude, aircraft heading and the MDA.

BRIEF DESCRIPTION OF THE DRAWINGS

Embodiments of the subject matter will hereinafter be described in conjunction with the following drawing figures, wherein like numerals denote like elements, and.

DETAILED DESCRIPTION

Embodiments of the subject matter described herein provide methods and systems for providing an indication of a calculated Visual Decent Point (VDP) for approaches for which VDP is not published. An alert for obstacle/terrain clearances and an indication of a touch down point may also be provided. In one embodiment, Visual Decent Point (VDP) is calculated considering data from a navigation and charts database. When the VDP is not published, the systems and methods described herein calculate the distance from a touchdown point to a visual descent point in nautical miles (nm).

An exemplary equation for calculating the distance to the VDP is:

$$\text{Visual Decent Point}(VDP)\text{distance} = \text{Height Above Touchdown}(HAT)/300 \text{ feet} \quad \text{(Equation 1)}$$

Equation 1 assumes roughly 300 feet per nautical mile for a target 3-degree glidepath. The actual trigonometric value of 318 feet may alternately be used. The height above touchdown or HAT is taken from digital chart data and corresponds to a difference between MDA and elevation of the target runway. HAT may alternatively be obtained from various avionics databases as described herein, such as a navigation database or an airport moving map database.

The systems and methods may alert the VDP based on a comparison of the distance to the touch down point from distance measuring equipment (DME) and the calculated distance to alert the location of the VDP.

In embodiments, the system and methods determine whether the planned approach does not have a published VDP by searching digital chart data (or other avionics data source such as a navigation database or an airport moving map database). If no published VDP is available, the VDP is calculated using chart data (or other avionics data source) describing at least HAT. The calculated VDP can be presented on a display device associated with an aircraft including a Heads Up Display (HUD), a Primary Flight Display (PFD), a Multi-Functional Display (MFD) and vertical displays. Symbology indicating the VDP may be included in a lateral and/or vertical map display. The symbology may differ depending on whether the VDP is published or calculated.

In some embodiments, an alert is provided considering Obstacle, Terrain and Touch Down point data. The terrain and obstacle alert may be provided based on a VDP constructed glide path profile. The alert is output when terrain or obstacles cross with the VDP constructed glide path profile. Clearance above height of obstacles and terrain altitudes may be configurable. In other embodiments, lateral and vertical deviations are indicated considering the calculated VDP data. A display interface may be provided for the pilot to input VDP data.

Figure 1:
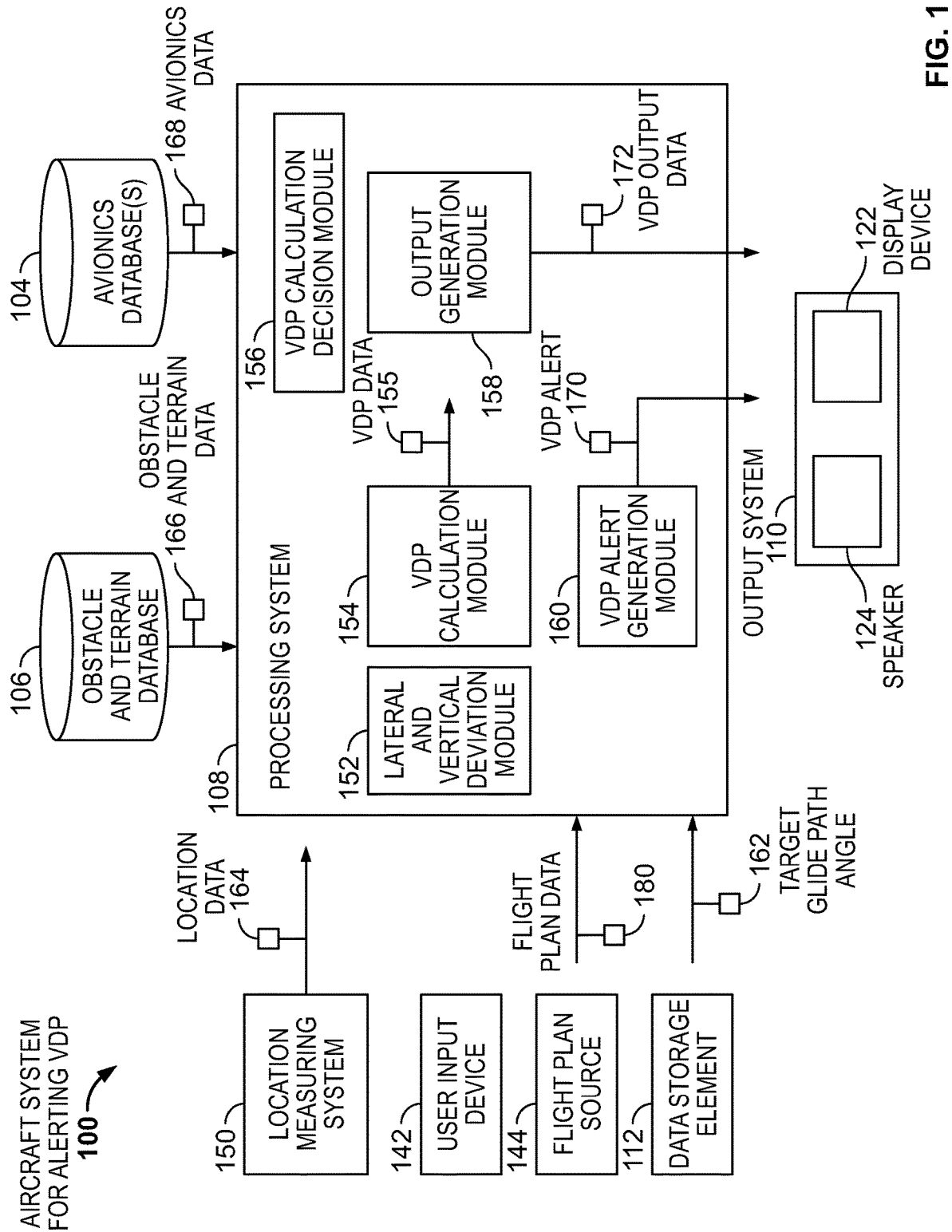
FIG. 1 is a block diagram of an aircraft system for alerting visual descent point, in accordance with an exemplary embodiment.

FIG. 1 depicts an exemplary embodiment of an aircraft system 100 suitable for alerting a Visual Descent Point (VDP). The illustrated system 100 includes a flight plan source 144, location measuring system 150, a user input device 142, an output system 110, a data storage element 112, an obstacle and terrain database 106 and an avionics database(s) 104 coupled to a processing system 108 that implements, executes, or otherwise supports programming for calculating and outputting the VDP. It should be appreciated that FIG. 1 is a simplified representation of an aircraft system 100 for purposes of explanation and is not intended to limit the subject matter in any way. In this regard, it will be appreciated that, in practice, an aircraft system 100 onboard an aircraft may include any number of different onboard systems configured to support operation of the aircraft, and the subject matter described herein is not limited to any particular type or number of onboard systems.

The avionics database(s) 104 includes any one or more providers of data relevant to an assessment of VDP. The avionics database(s) 104 can include navigation and charts databases, airport moving map database, etc. including digital data describing approach plates and approach procedures in general. The data particularly includes runway elevation, minimum descent altitude (MDA), an offset of an approach end of the runway and a target touchdown point and any published VDPs related to airports, and specific runways at airports, at locations across a particular territory or globally. The obstacle and terrain database 106 includes a terrain dataset providing a digital representation of the elevation of the terrain at discrete points. Major features of a terrain database include geometric distribution/position of discrete points, horizontal/vertical datum and specific units of measurement. Terrain includes the surface of the Earth containing naturally occurring features such as mountains, hills, ridges, valleys, bodies of water, permanent ice and snow, and excluding obstacles. An obstacle dataset is additionally included and provides a digital representation of obstacles, which includes the horizontal and vertical extent of man-made and natural significant features. Obstacles include all fixed (whether temporary or permanent) and mobile objects, or parts thereof, that: a) are located on an area intended for the surface movement of aircraft; or b) extend above a defined surface intended to protect aircraft in flight; or c) stand outside those defined surfaces and that have been assessed as being a hazard to air navigation.

In the example of FIG. 1, the aircraft system 100 includes a flight plan source 144. The flight plan source 144 can be an FMS. An FMS is a specialized computer system that automates a wide variety of in-flight tasks, reducing the workload on the flight crew. A primary function is in-flight management of the flight plan. Using various sensors (such as GPS and INS often backed up by radio navigation) to determine the aircraft's position, the FMS can guide the aircraft along the flight plan. A user input device 142 allows the flight crew to enter data and make selections relating at least to the flight plan. The user input device 142 further allows the user to enter data regarding the VDP calculation such as a target glidepath angle 162. Alternatively, the target glidepath angle 162 may be retrieved from a data storage element 112 and may be an equipment or user preference parameter.

The flight management system can be configured to implement one or more flight mode(s), flight plans, etc. of the aircraft of the aircraft system 100 selected by user input and display information associated with the one or more flight mode(s) on the one or more display devices 122. In embodiments, a navigation function of the flight management system allows a route to be programmed by a user through the user input device 142. A flight director (not shown) and an auto-pilot system (not shown) can steer the aircraft along the desired course to an active waypoint. When the aircraft reaches an active waypoint, the flight management system automatically sequences to the next waypoint in the route, unless waypoint sequencing is suspended. The flight management system, which may be the flight plan source 144, outputs flight plan data defining waypoints between an origin and a destination making up a flight plan for the aircraft. The waypoints are specified in terms of altitude, latitude and longitude. The flight plan source may output flight plan data 180 describing the flight plan. The flight plan data 180 may specify a target runway at a target airport as a destination of the flight plan. The flight plan may adapt during flight depending on changing conditions and any updates from external sources such as Air Traffic Control.

The aircraft system 100 includes a location measuring system 150, which includes Distance Measuring Equipment (DME) and a global positioning system (GPS) device. The DME measures the location of the aircraft relative to a ground station. The DME measures a slant range distance to the ground station by measuring a time of flight of a signal sent from the aircraft to the ground station, which is then returned to the aircraft. The GPS device uses satellite signals to triangulate a position of the aircraft. The location measuring system 150 thus outputs location data 164 describing a global location of the aircraft and a relative location to the ground station. The flight plan source 144 can track progress along the flight plan based on the location data 164. Further, the systems and methods described herein can alert the VDP being reached based on the location data 164.

In embodiments, the user input device 142 is located in the cockpit and provides input to one or more system(s) of the aircraft system 100. The user input device 142 includes any device suitable to accept input from a user for interaction with the aircraft system 100. For example, the user input device 142 includes one or more of a keyboard, joystick, multi-way rocker switches, mouse, trackball, touch screen, touch pad, data entry keys, a microphone suitable for voice recognition, and/or any other suitable device. The user input device 142 allows the user to interact with a graphic and/or textual data element provided for display on the one or more display devices 122.

Although not illustrated in FIG. 1, the aircraft system 100 includes other onboard system(s) representing any sort of electrical, mechanical, hydraulic, pneumatic, environmental, or propulsion systems configured to provide information or data that characterizes or is otherwise indicative of a current operational status of the vehicle. For example, in the case of an aircraft, the onboard systems could include or otherwise be realized as any one or more of the following: a flight management system (FMS), a communications system, a navigational system, a weather system, a radar system, an autopilot system, an autothrust system, a landing gear system, a flight control system, hydraulics systems, pneumatics systems, environmental systems, aircraft systems, engine systems, trim systems and/or another avionics system.

In exemplary embodiments, the output system 110 includes one or more electronic display devices 122 onboard the aircraft for presenting data and/or information to the flight crew. In exemplary embodiments, a display device 122 is coupled to the processing system 108, with the processing system 108 providing VDP output data 172 embodying a graphical alert to be displayed regarding VDP. Additionally, in some embodiments, the output system 110 may include a speaker or other audio output device that may be utilized by the processing system 108 to provide an auditory alert regarding the VDP. In embodiments, the alert illustrates where the VDP is relative to the aircraft in a lateral and vertical view. The alert can further visually guide, vertically and laterally, the pilot along a constructed approach path from the VDP to the touch down point.

Figure 4:
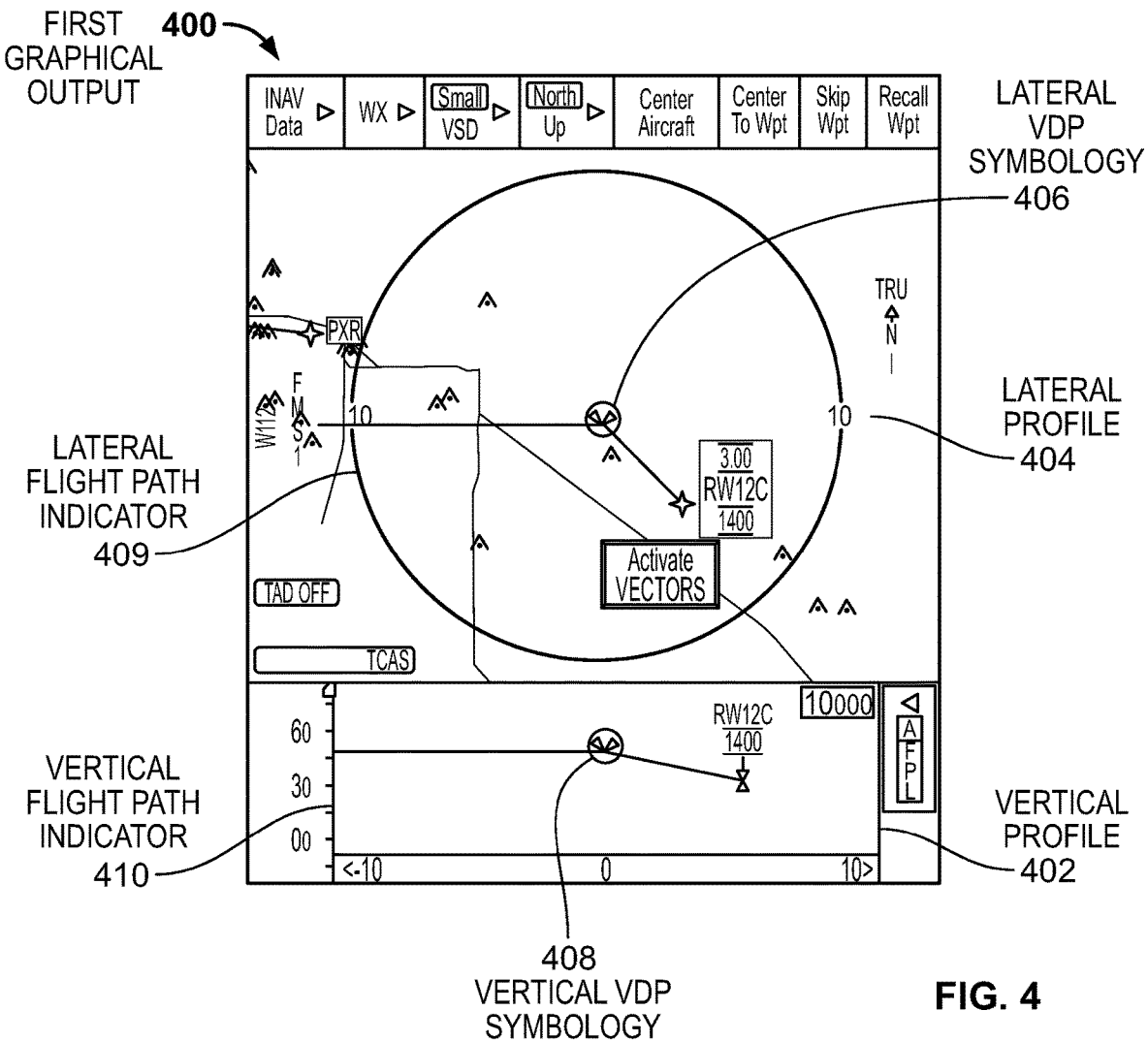
FIGS. 4 and 5 illustrate exemplary graphical outputs providing an indication of visual descent point, in accordance with exemplary embodiments.
Figure 5:
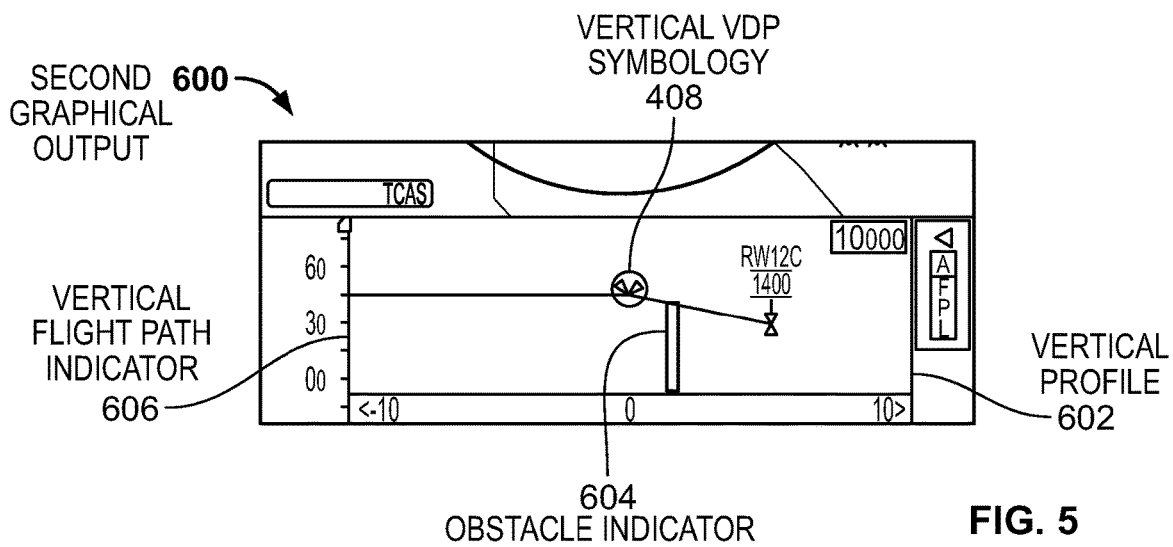
Figure 6:
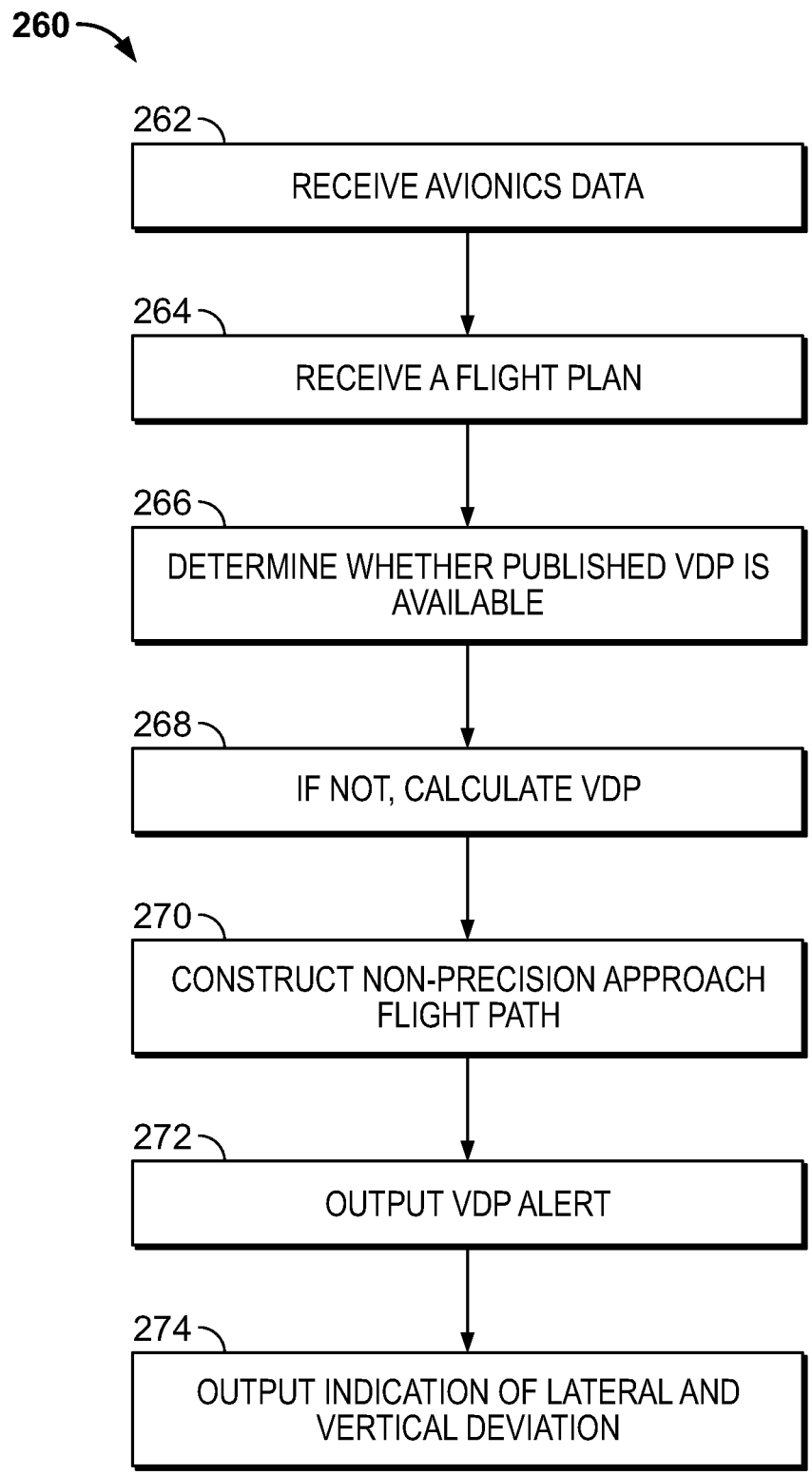
FIG. 6 is a flowchart of a method for alerting visual descent point, in accordance with an embodiment.

The processing system 108 generally represents the hardware, software, and/or firmware components (or a combination thereof), which is communicatively coupled to the various elements of the system 100 and configured to support the VDP alert generation functions described herein, particularly with respect to exemplary graphical alerts of FIGS. 4 and 5 and the method 600 of FIG. 6. Depending on the embodiment, the processing system 108 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 108 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 108 may include processing logic that may be configured to carry out the functions, techniques, and processing tasks associated with the operation of the system 100, as described in greater detail below. Furthermore, the steps of a method or algorithm described in connection with the embodiments disclosed herein may be embodied directly in hardware, in firmware, in a software module executed by the processing system 108, or in any practical combination thereof. In the illustrated embodiment, the processing system 108 includes or otherwise accesses the data storage element 112 (or memory) capable of storing code or other computer-executable programming instructions that, when read and executed by the processing system 108, cause the processing system 108 to generate, implement, or otherwise execute the various modules 152 to 160 that supports or otherwise performs certain tasks, operations, functions, and/or processes described herein.

The data storage element 112 generally represents any sort of non-transitory short- or long-term storage media capable of storing code, computer-executable programming instructions, and/or other data. Depending on the embodiment, the data storage element 112 may include or otherwise be physically realized using random access memory (RAM), read only memory (ROM), flash memory, registers, a hard disk, or another suitable data storage medium known in the art or any suitable combination thereof. Moreover, in some embodiments, the data storage element 112 may be realized as a database or some other remote data storage or device that is communicatively coupled to the processing system 108 via a communications network. In such embodiments, data maintained at the data storage element 112 may be downloaded or otherwise retrieved by the processing system 108 and stored locally at the processing system 108 or an onboard data storage element.

Figure 2:
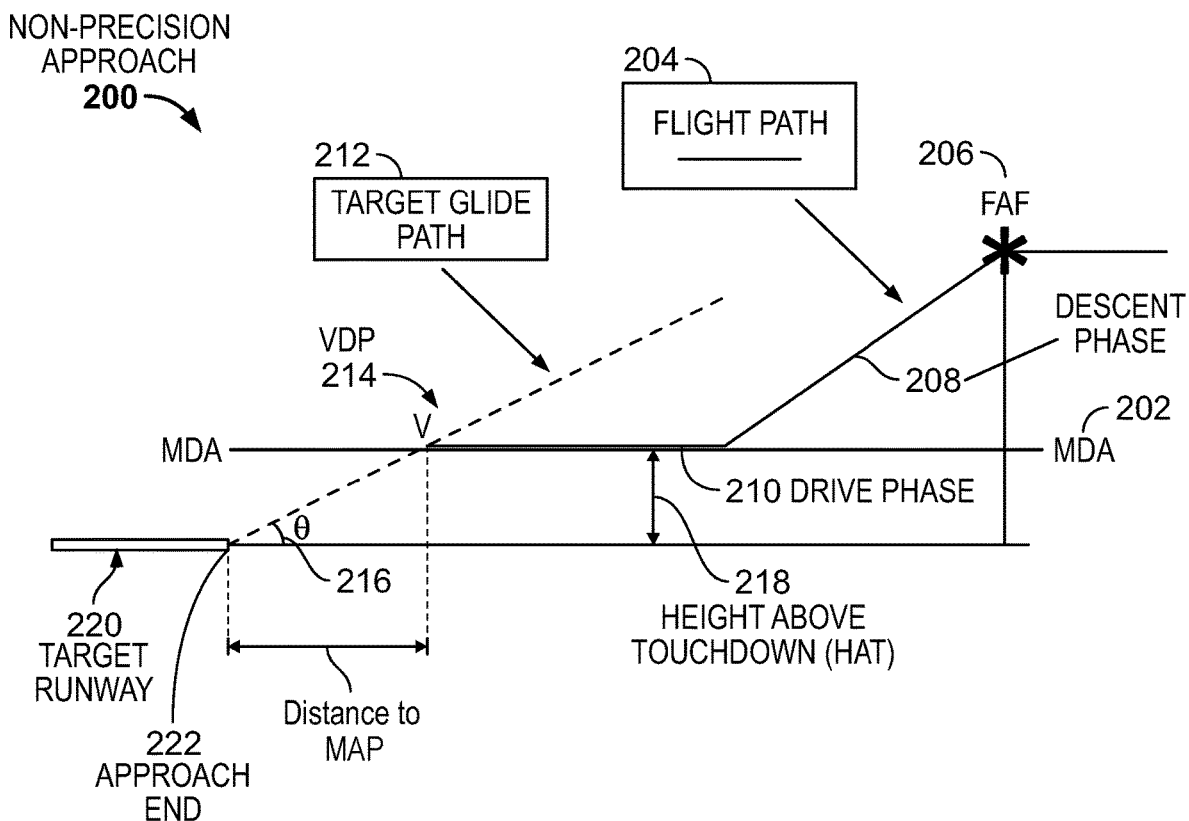
FIG. 2 depicts an exemplary non-precision approach, in accordance with an exemplary embodiment.

With reference to FIGS. 1 and 2, the processing system 108 receives the flight plan data 180 specifying a target runway 220 and a planned non-precision approach. Further, the processing system 108 receives avionics data 168 from the avionics database(s) 104. For pilots who are flying under Instrument Flight Rules (IFR), there are three types of terminal instrument procedures (TERPS) or instrument approach procedures (IAPs) that can be used during an instrument landing. A precision approach (PA) is, as one would expect given the name, the most precise. It uses a navigation system that supplies both course and glidepath deviation data. An ILS (Instrument Landing System) is commonly used to guide precision approaches. A second type of TERPS is the approach with vertical guidance (APV). The navigation system used for an APV approach provides both course and glidepath deviation data similar to the PA, but not to such a carefully calibrated standard. Therefore, the vertical guidance supplied by an APV is less precise than that of a PA. Approach with Vertical Guidance is supported by LNAV/VNAV systems. Another type of TERPS is the non-precision approach (NPA). For this instrument-based approach, the pilot's navigational system provides feedback on course deviation, but no data on glidepath deviation. The VOR system is commonly used to support and guide non-precision approaches. A Continuous Descent Final Approach (CDFA) is one method of guiding descent rate on a non-precision approach and CDFAs are published for many non-precision approaches. Where a CDFA is not available, pilots can land using a step-down approach or the "dive and drive" method of descending to the minimum descent altitude immediately upon reaching the final approach fix (FAF) 206. In either the CDFA or the dive and drive method, the VDP 214 is located on the target glide path 212 and can play a key role in guiding a landing process.

The VDP 214 is a defined point on the final approach course of a non-precision straight-in approach procedure from which normal descent from the Minimum Descent Altitude (MDA) 202 to the runway touchdown point may be commenced, provided the approach threshold of that runway, or approach lights, or other markings identifiable with the approach end of that runway are clearly visible to the pilot. The MDA 202 is the lowest altitude to which an aircraft can descend on final during a standard instrument approach procedure (SIAP) with no electronic glideslope provided. During the descent, the aircraft should remain at or above the MDA 202 until the necessary visibility to safely descend and one of the approved visual references has been acquired. Often, the visual descent point is the position from which you can descend from MDA 202 while maintaining about a 3-degree target glide path 212 and landing at the touchdown point. Other desired angle target glide paths 212 can be set by the user or by the system. The flight plan data 180 describes the FAF 206 and the target runway 220. The MDA 202 and elevation of the target runway 220 is available in avionics data 168.

Continuing to refer to the aircraft system 100 of FIG. 1, the processing system 108 includes a plurality of modules 152 to 160. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality via program instructions. The plurality of modules include a lateral and vertical deviation module 152, a VDP calculation module 154, a VDP calculation decision module 156, an output generation module 158 and a VDP alert generation module 160 in the exemplary embodiment of FIG. 1.

The VDP calculation decision module 156 determines whether the VDP should be calculated. The VDP calculation decision module 156 access an identification of the target runway from the flight plan data 180 and navigation and charts data from the avionics database(s) for the target runway. If there is a published VDP in the avionics data 168 for the target runway, the published VDP can be used in generating the alerts described herein. If there is not a published VDP in the avionics data 168, the VDP calculation module 154 can be called to calculate the VDP.

In another embodiment, the aircraft system 100 may be configured to verify a published VDP retrieved from the avionics database 104 or a pilot entered VDP. In a first step, a VDP is calculated as described herein based on HAT data retrieved from the avionics database 104. In one embodiment, the calculated VDP is compared with the published VDP data to alert if the value is not within a defined threshold value. In another embodiment, the calculated VDP is compared with the pilot entered VDP data to alert if the value is not within the defined threshold value.

Referring additionally to FIG. 2, calculation of the VDP is described. FIG. 2 shows a non-precision approach profile 200 that may be at least partly defined by the flight plan. The non-precision approach profile includes the FAF 206, a drive phase 210 and a descent phase between the drive phase 210 and the FAF 206. The pilot should begin a final descent to landing when the VDP is reached when flying along the drive phase 210, which has a substantially constant altitude profile. The drive phase 210 should be at or above the MDA 202. In order to determine the VDP, the VDP calculation module 154 assumes a constant angle θ 216 for the final descent to landing. The VDP calculation module 154 determines the HAT 218 based on a difference between the MDA and an elevation of the target runway 220. Based on trigonometry or a simplified equation, such as equation 1 above, a slant angle distance to the touch down zone can be calculated. By extending the slant angle distance from the touchdown point, the position of intersection with the MDA 202 is the VDP 214. In embodiments, an offset from the touchdown point to an approach end of the runway 222 is taken into account when determining the VDP 214.

Figure 3:
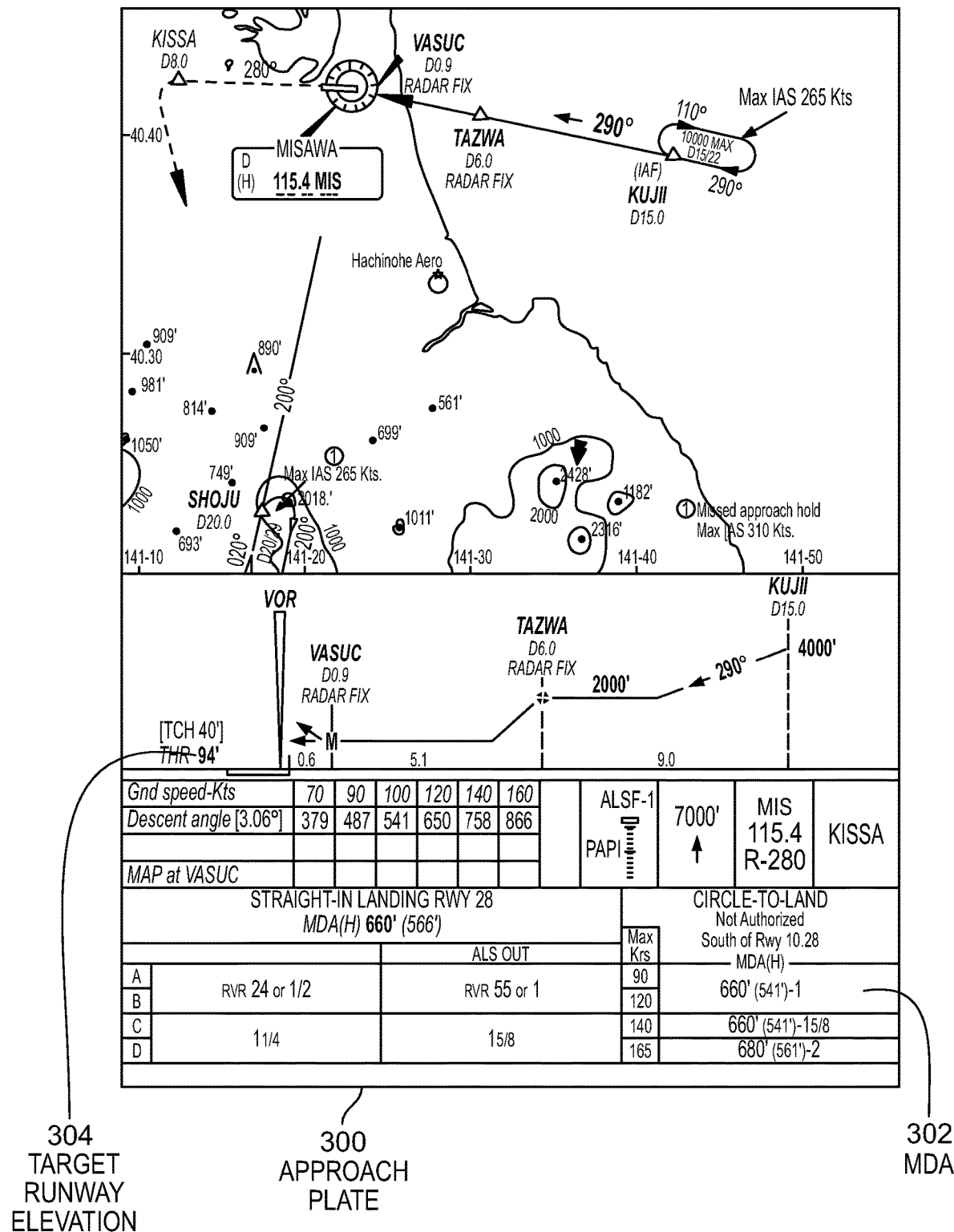
FIG. 3 depicts an exemplary approach plate, in accordance with an exemplary embodiment.

An example calculation of VDP by the VDP calculation module 154 is described with respect to FIG. 3. FIG. 3 illustrates an approach plate 300 for Misawa Air Base in Japan. The approach plate 300 is digitized and the information fields are included in avionics database(s) 104. The approach plate 300 does not have an entry for a field for published VDP but does specify the MDA 302 and the target runway elevation 304. The VDP calculation module 154 calculates the VDP by subtracting the target runway elevation 304 (touchdown zone elevation) from the MDA 302 and dividing the result by 300 as per equation 1 above. Rather than using the approximated equation 1, a more accurate value of 318 feet per nautical mile could be used in place of 300 feet per nautical mile or a full trigonometric evaluation could be performed. The dive and drive technique is one procedure to know when to leave the MDA. In the present example, the MDA is at 660 feet MSL (Mean Sea Level) in the approach plate/chart 300. Since the runway is at 94' feet MSL, the HAT is (660-94) and the distance to the touch down point from the VDP is, according to equation 1:

$$VDP\ distance\ from\ touch\ down\ point = ((MDA - TouchDown\ ZonE(TDZE)elevation)/300) = ((660-94)/300) = 1.9\ nm\ from\ end\ of\ runway$$

From the approach plate 300, it appears the end of the runway is at 0.3 DME, such that a VDP of 1.9-0.3=1.6 nm is calculated when the offset of touchdown zone and approach end of the runway is factored into the determination. The technique is based on the assumption that a 3° target glide path comes to about 300 feet per nautical mile.

The VDP calculation module 154 outputs VDP data 155 including at least the coordinates of the calculated VDP. The VDP calculation module 154 thus resolves the intersection point between the target glide path 212 from the touchdown point or the approach end of the runway 222 and the MDA 202 and combines this intersection point (or VDA) with the flight plan to construct a flight path 204 (see FIG. 2). In constructing the flight path 204, the VDP calculation module 154 may assume a dive and drive method from the FAF 206 where the drive phase 210 extends along the MDA until the calculated VDP is reached. The flight path 204 can include the three-dimensional VDP 214, the FAF 206 and the target glide path 212 as it extends between the VDP 214 and the target runway 220. The constructed flight path may be included in the VDP data 155. The VDP calculation module 154 may also construct a flight path 204 for published VDPs where such a flight path is not already described in the digital charts of the avionics data 168 from the avionics database(s) 104.

In embodiments, the VDP alert generation module 160 alerts when the aircraft is approaching the calculated or published VDP. This monitoring may be performed based on a comparison of the location of the aircraft in the location data 164 and a location of the VDP in the VDP data 155. The location of the aircraft may be a global/absolute location. In another embodiment, the VDP calculation module 154 outputs a relative distance between the target runway and the VDP and the VDP alert generation module 160 compares the relative distance to corresponding relative distance information contained in the location data 164, e.g. as determined by the DME. The alert may be aural or visual and may inform the pilot of a distance or time remaining until the aircraft intercepts with the VDP. A VDP alert 170 is output by the VDP alert generation module 160 to cause an aural or visual output through the output system 110. The visual output can be a numerical output concerning distance between the aircraft and the VDP or a coded (e.g. color coded) symbology could be implemented.

In embodiments, the output generation module 158 receives the VDP data 155 and integrates the location of the VDP into a flight plan display on the display device 122. The output generation module 158 provides VDP output data 172 describing the depiction of a graphical output embodying a flight plan indication and VDP symbology. With reference to FIG. 4, a first exemplary graphical output 400 including VDP symbology along a flight plan is illustrated. The first graphical output 400 includes a lateral profile 404 and a vertical profile 402 although just one type of profile may be displayed. The lateral profile 404 includes a lateral flight path indication 409 based on the flight plan data 180 and a lateral VDP symbology 406 based on the three-dimensional location of the VDP included in the VDP data 155. The lateral VDP symbology 406 is located along the lateral flight path indication 409. Similarly, the vertical profile 402 includes a vertical flight path indication 410 and a vertical VDP symbology 408. The lateral and/or vertical VDP symbology 406, 408 may be a V-shaped icon. In one embodiment, the lateral and/or vertical VDP symbology 406, 408 may differ depending on whether the VDP is a published VDP or a calculated VDP. For example, the V-shaped icon may be circled when based on calculated VDP and not-circled when based on published VDP.

In the example of FIG. 5, a second graphical output 600 is depicted in the form of a vertical profile 602. The output generation module 158 receives the VDP data 155 describing the location of the VDP and the constructed flight path. Further, the output generation module 158 receives obstacle and terrain data 166 from the obstacle and terrain database 106. Any obstacles or terrain within a predetermined clearance distance from the constructed flight path are identified and represented in the VDP output data 172. Referring back to FIG. 5, the vertical profile 602 includes an obstacle indicator 604 representing, optionally substantially to scale and in a representative position along the vertical flight path indicator 606, any of the identified obstacles or terrain. Such an obstacle indicator 604 could additionally, or alternatively, be included in a lateral profile at a location along a flight path indicator representative of the corresponding location of the terrain or obstacle in the real world according to the obstacle and terrain data 166. Further, the obstacle indicator 604 could be color coded or otherwise alert a threat level posed by obstacle or terrain based on the amount of clearance available between the constructed flight path and the obstacle. Like in FIG. 4, the vertical profile of FIG. 5 includes a vertical VDP symbology corresponding to a location of the VDP along the flight path indicator 606.

In one embodiment, the processing system 108 includes a lateral and vertical deviation module 152 that receives the constructed flight path from the VDP calculation module 154 and also location data 164 from the location measuring system 150. The lateral and vertical deviation module 152 compares a current location of the aircraft according to the location data 164 in three dimensions with the constructed glide path and provides an indication, via the output system 110, of lateral and vertical deviations. The indication may be a graphical or numeric indication. For example, a horizontal and vertical reference cross-hair could be graphically displayed and horizontal and vertical bars could move relative to the reference cross-hair to show an amount of lateral and vertical deviation. Other indicator forms could be provided.

A flow chart of an exemplary method 260 of generating VDP alerts is provided in FIG. 4. The method 260 is computer implemented by the processing system 108 of FIG. 1, specifically by the various modules 152 to 160 of FIG. 1. The method includes step 262 of receiving avionics data 168 from the avionics database(s) 104 and receiving a flight plan, embodied in flight plan data 180, from the flight plan source 144. In step 266, a determination is made as to whether the avionics data 168 includes a published VDP. The flight plan identifies a target runway, which could be used to look-up digital charts data in the avionics data 168 for the target runway. The charts data include digitized approach plate information such as that illustrated in FIG. 3. If there is a published VDP, then the method proceeds to step 270 of constructing a non-precision approach flight path based on the published VDP. If there is no published VDP, step 268 is executed by which the VDP is calculated based on the MDA, the altitude of the target runway and a target glide path angle, which are data items in the avionics data 168. The calculations of step 268 may be based on trigonometry, or an approximation like in equation 1, which provides a distance from the VDP to the target runway. This distance can be extended between an approach end of the runway, which is known from avionics data or from DME, and the MDA to determine the VDP.

In embodiments, a non-precision approach flight path can be constructed, particularly extending between the calculated or published VDP and the approach end or touch down point of the target runway. The constructed flight path may additionally include a descent phase 208 and a drive phase 210 as exemplified in FIG. 2, which is drawn from the FAF 206 to the target runway 220 and includes the target glide path 212 between the VDP and the target runway.

In step 272, a VDP alert is output. The VDP alert includes a depiction of the VDP by way of symbology 406, 408 included in a flight path indication 409, 410, 606 at the location along the flight path of the calculated or published VDP, as illustrated in FIGS. 4 and 5. The output VDP alert may additionally, or alternately, reflect a comparison of the distance to the approach end of the target runway as determined by DME and a distance to the approach end of the target runway as determined by the VDP calculation module 154. Alternatively, a comparison of the aircraft position based on the location data 164 from the location measuring system 150 and the calculated or published VDP may be made. A graphical or aural annunciation of approaching VDP, and optionally a distance to the VDP, may be output as the VDP alert.

In step 274, which is optional, the flight path constructed in step 270 is used to determine lateral and vertical deviations of the aircraft from the constructed flight path based on aircraft location included in location data 164. A graphical output may be provided indicating the lateral and vertical deviation from the constructed flight path, particularly for the target glide path between the target runway and the VDP. The constructed flight path may also be used to provide a user interface indicating terrain and obstacle threats based on obstacle and terrain data 166 from the obstacle and terrain database 106, as shown by the graphical element 604 in the example of FIG. 5.

Figure 7:
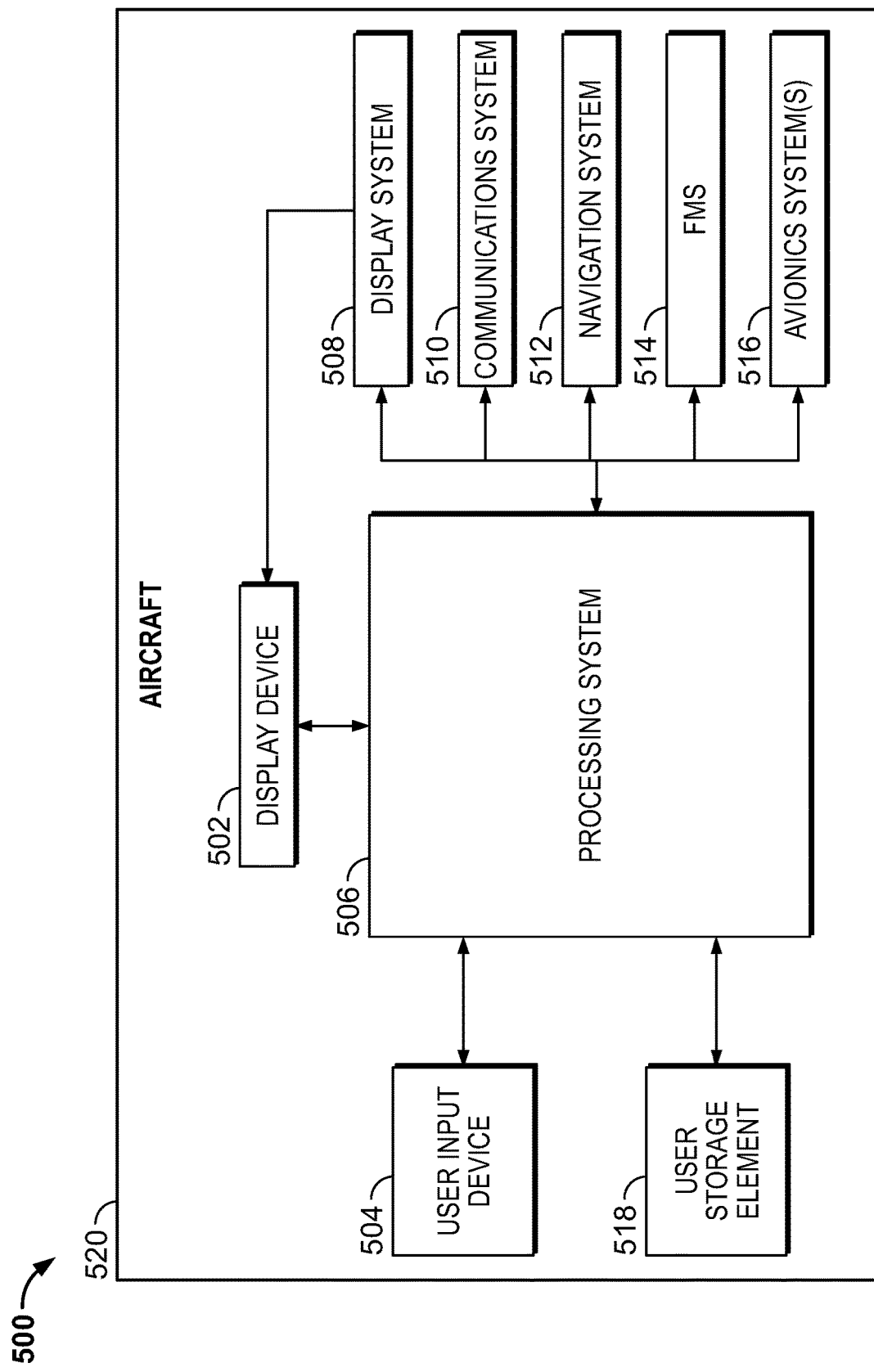
FIG. 7 depicts an exemplary embodiment of an aircraft system suitable for implementing the systems and methods for alerting visual descent point, in accordance with one or more embodiments.

FIG. 7 depicts an exemplary embodiment of an aircraft system 500 suitable for implementing the VDP alerts described herein. The illustrated aircraft system 500 (corresponding to aircraft system 100 of FIG. 1) includes, without limitation, a display device 502 (corresponding to display device 122 of FIG. 1), one or more user input devices 504 (corresponding to user input device 142 of FIG. 1), a processing system 506 (corresponding to processing system 108 of FIG. 1), a communications system 510, a navigation system 512, a flight management system (FMS) 514 (corresponding to the flight plan source 144 of FIG. 1), one or more avionics systems 516, and a data storage element 518 (corresponding to data storage element 112 of FIG. 1) suitably configured to support operation of the system 500.

In exemplary embodiments, the display device 502 is realized as an electronic display capable of graphically displaying flight information or other data associated with operation of the aircraft 520 under control of the display system 508 and/or processing system 506. In this regard, the display device 502 is coupled to the display system 508 and the processing system 506, wherein the processing system 506 and the display system 508 are cooperatively configured to display, render, or otherwise convey one or more graphical representations or images associated with operation of the aircraft 520 on the display device 502. The user input device 504 is coupled to the processing system 506, and the user input device 504 and the processing system 506 are cooperatively configured to allow a user (e.g., a pilot, co-pilot, or crew member) to interact with the display device 502 and/or other elements of the system 500, as described herein. Depending on the embodiment, the user input device (s) 504 may be realized as a keypad, touchpad, keyboard, mouse, touch panel (or touchscreen), joystick, knob, line select key or another suitable device adapted to receive input from a user. In some embodiments, the user input device 504 includes or is realized as an audio input device, such as a microphone, audio transducer, audio sensor, or the like, that is adapted to allow a user to provide audio input to the system 500 in a "hands free" manner without requiring the user to move his or her hands, eyes and/or head to interact with the system 500.

The processing system 506 generally represents the hardware, software, and/or firmware components configured to facilitate communications and/or interaction between the elements of the aircraft system 500 and perform additional tasks and/or functions to support the various modules 152 to 160 of FIG. 1 during operation of the aircraft system 500, as described herein. Depending on the embodiment, the processing system 506 may be implemented or realized with a general-purpose processor, a content addressable memory, a digital signal processor, an application specific integrated circuit, a field programmable gate array, any suitable programmable logic device, discrete gate or transistor logic, processing core, discrete hardware components, or any combination thereof, designed to perform the functions described herein. The processing system 506 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 506 includes processing logic that may be configured to carry out the functions, techniques, and processing tasks associated with the operation of the aircraft system 500, as described herein. Furthermore, the steps of a method or algorithm described in connection with the embodiments disclosed herein may be embodied directly in hardware, in firmware, in a software module executed by the processing system 506, or in any practical combination thereof. For example, in one or more embodiments, the processing system 506 includes or otherwise accesses a data storage element 518 (or memory), which may be realized as any sort of non-transitory short- or long-term storage media capable of storing programming instructions for execution by the processing system 506. The code or other computer-executable programming instructions, when read and executed by the processing system 506, cause the processing system 506 to support or otherwise perform certain tasks, operations, and/or functions described herein in the context of the flight rules alerts. Depending on the embodiment, the data storage element 518 may be physically realized using RAM memory, ROM memory, flash memory, registers, a hard disk, or another suitable data storage medium known in the art or any suitable combination thereof.

The display system 508 generally represents the hardware, software, and/or firmware components configured to control the display and/or rendering of one or more navigational maps and/or other displays pertaining to operation of the aircraft 520 and/or onboard systems 510, 512, 514, 516 on the display device 502. In this regard, the display system 508 may access or include one or more databases suitably configured to support operations of the display system 508, such as, for example, a terrain database, an obstacle database, a navigational database, a geopolitical database, a terminal airspace database, a special use airspace database, or other information for rendering and/or displaying navigational maps and/or other content on the display device 502.

Still referring to FIG. 5, in an exemplary embodiment, the processing system 506 is coupled to the navigation system 512, which is configured to provide real-time navigational data and/or information regarding operation of the aircraft 520. The navigation system 512 may be realized as a global navigation satellite system (e.g., a global positioning system (GPS), a ground-based augmentation system (GBAS), a satellite-based augmentation system (SBAS), and/or the like), inertial reference system (IRS), or a radio-based navigation system (e.g., VHF omni-directional radio range (VOR) or long range aid to navigation (LORAN)), and may include one or more navigational radios or other sensors suitably configured to support operation of the navigation system 512, as will be appreciated in the art. The navigation system 512 is capable of obtaining and/or determining the instantaneous position of the aircraft 520, that is, the current (or instantaneous) location of the aircraft 520 (e.g., the current latitude and longitude) and the current (or instantaneous) altitude or above ground level for the aircraft 520. The navigation system 512 is also capable of obtaining or otherwise determining the heading of the aircraft 520 (i.e., the direction the aircraft is traveling in relative to some reference). In the illustrated embodiment, the processing system 506 is also coupled to the communications system 510, which is configured to support communications to and/or from the aircraft 520. For example, the communications system 510 may support communications between the aircraft 520 and air traffic control or another suitable command center or ground location. In this regard, the communications system 510 may be realized using a radio communication system and/or another suitable data link system.

In an exemplary embodiment, the processing system 506 is also coupled to the FMS 514, which is coupled to the navigation system 512, the communications system 510, and one or more additional avionics systems 516 to support navigation, flight planning, and other aircraft control functions in a conventional manner, as well as to provide real-time data and/or information regarding the operational status of the aircraft 520 to the processing system 506. Although FIG. 5 depicts a single avionics system 516, in practice, the aircraft system 500 and/or aircraft 520 will likely include numerous avionics systems for obtaining and/or providing real-time flight-related information that may be displayed on the display device 502 or otherwise provided to a user (e.g., a pilot, a co-pilot, or crew member). For example, practical embodiments of the aircraft system 500 and/or aircraft 520 will likely include one or more of the following avionics systems suitably configured to support operation of the aircraft 520: a weather system, an air traffic management system, a radar system, a traffic avoidance system, an autopilot system, an autothrust system, a flight control system, hydraulics systems, pneumatics systems, environmental systems, aircraft systems, engine systems, trim systems, lighting systems, crew alerting systems, electronic checklist systems, an electronic flight bag and/or another suitable avionics system. In various embodiments, the processing system 506 may obtain information pertaining to the current location and/or altitude of the aircraft 520 and/or other operational information characterizing or otherwise describing the current operational context or status of the aircraft 520 from one or more of the onboard systems 508, 510, 512, 514, 516.

It should be understood that FIG. 5 is a simplified representation of the aircraft system 500 for purposes of explanation and ease of description, and FIG. 5 is not intended to limit the application or scope of the subject matter described herein in any way. It should be appreciated that although FIG. 5 shows the various elements of the system 500 being located onboard the aircraft 520 (e.g., in the cockpit), in practice, one or more of the elements of the system 500 may be located outside the aircraft 520 (e.g., on the ground as part of an air traffic control center or another command center) and communicatively coupled to the remaining elements of the aircraft system 500 (e.g., via a data link and/or communications system 510). For example, in some embodiments, the data storage element 518 may be located outside the aircraft 520 and communicatively coupled to the processing system 506 via a data link and/or communications system 510. Furthermore, practical embodiments of the aircraft system 500 and/or aircraft 520 will include numerous other devices and components for providing additional functions and features, as will be appreciated in the art. In this regard, it will be appreciated that although FIG. 5 shows a single display device 502, in practice, additional display devices may be present onboard the aircraft 520. Additionally, it should be noted that in other embodiments, features and/or functionality of processing system 506 described herein can be implemented by or otherwise integrated with the features and/or functionality provided by the FMS 514. In other words, some embodiments may integrate the processing system 506 with the FMS 514. In yet other embodiments, various aspects of the subject matter described herein may be implemented by or at an electronic flight bag (EFB) or similar electronic device that is communicatively coupled to the processing system 506 and/or the FMS 514.

Referring to FIG. 5 with reference to FIG. 1, the processing system 506 may be able to determine whether published VDP is available in avionics data 168, calculate the VDP if necessary and generate symbology on a flight plan indication depicting a location of the VDP along the flight plan.

For the sake of brevity, conventional techniques related to sensors, statistics, data analysis, avionics systems, redundancy, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

The foregoing detailed description is merely exemplary in nature and is not intended to limit the subject matter of the application and uses thereof. Furthermore, there is no intention to be bound by any theory presented in the preceding background, brief summary, or the detailed description.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A method for alerting a Visual Decent Point (VDP) in an aircraft system, the method comprising:
    retrieving, via at least one processor, at least runway altitude data and Minimum Descent Altitude (MDA) data from an avionics database for a target runway;
    calculating, via the at least one processor, the VDP based on a difference between the runway altitude data and the MDA so as to achieve a target downward acceptable glidepath angle during final descent from the MDA to the target runway;
    outputting, via the at least one processor, an alert of the VDP by an output device of the aircraft system;
    receiving, via the at least one processor, a distance from the target runway from Distance Measuring Equipment (DME);
    calculating, via the at least one processor, a distance to the target runway based on a difference between the runway altitude data, the MDA and the target downward acceptable glidepath angle during final descent from the MDA to the target runway; and
    outputting, via the at least one processor, the alert based on a comparison of the calculated distance and the received distance.

2. The method of claim 1, wherein outputting the alert includes displaying a VDP symbology on an aircraft display that depicts an indication of a flight plan path.

3. The method of claim 1, wherein outputting the alert includes displaying a VDP symbology on a vertical or lateral map display that depicts an indication of a flight plan path.

4. The method of claim 1, wherein the target downward acceptable glidepath angle is about 3°.

5. The method of claim 1, wherein the retrieving further includes retrieving an offset distance between an end of the runway and a target touchdown location on the runway, wherein the calculating is further based on the offset distance.

6. The method of claim 1, comprising:
determining, via the at least one processor, a final descent flight path during final descent based at least on the VDP, the target acceptable glidepath angle and aircraft position;
retrieving, via the at least one processor, terrain and obstacle data for the final descent from a Terrain and Obstacle Database;
determining any intersection between the final descent flight path during final descent and terrain or obstacles described in the terrain and obstacle data including a clearance factor; and
outputting, via the at least one processor, an obstacle or terrain alert during the final descent based on any determined intersection.

7. The method of claim 1, comprising:
determining, via the at least one processor, a final descent flight path during final descent based at least on the VDP, the target acceptable glidepath angle, aircraft position and runway orientation;
determining any deviations outside of a defined acceptable range from the final descent flight path based on sensed aircraft position; and
outputting a deviation alert based on the deviations.

8. The method of claim 7, wherein the deviations include lateral and vertical deviations.

9. The method of claim 1, comprising:
receiving, via the at least one processor, published VDP data from the avionics database or pilot entered VDP data;
comparing, via the at least one processor, the calculated VDP with the published VDP data or the pilot entered VDP data; and
outputting, via the output device, an alert if the comparison is not within a defined threshold value.

10. A system for alerting a Visual Decent Point (VDP) in an aircraft, the system comprising:
an output device;
a processor in operable communication with the output device, the processor configured to execute program instructions, wherein the program instructions are configured to cause the processor to:
retrieve at least runway altitude data and Minimum Descent Altitude (MDA) data from an avionics database for a target runway;
calculate the VDP based on a difference between the runway altitude data and the MDA so as to achieve a target downward acceptable glidepath angle during final descent from the MDA to the target runway;
output an alert of the VDP by the output device of the aircraft system;
receive a distance from the target runway to the aircraft from Distance Measuring Equipment (DME) or calculate the distance from the target runway to the aircraft based on aircraft location data and target runway location data;
calculate a distance to the target runway based on a difference between the runway altitude data, the MDA and the target downward acceptable glidepath angle during final descent from the MDA to the target runway; and
output the alert based on a comparison of the calculated distance and the received distance.

11. The system of claim 10, wherein output of the alert includes displaying a VDP symbology on an aircraft display that depicts an indication of a flight plan path.

12. The system of claim 10, wherein output of the alert includes displaying a VDP symbology on a vertical or lateral map display that depicts an indication of a flight plan path.

13. The system of claim 10, wherein the target downward acceptable glidepath angle is about 3°.

14. The system of claim 10, wherein the retrieving further includes retrieving an offset distance between an end of the runway and a target touchdown location on the runway, wherein the calculating is further based on the offset distance.

15. The system of claim 10, wherein the program instructions are configured to cause the processor to:
determine a final descent flight path during final descent based at least on the VDP, the target acceptable glidepath angle and aircraft position;
retrieve terrain and obstacle data for the final descent from a Terrain and Obstacle Database;
determine any intersection between the final descent flight path during final descent and terrain or obstacles described in the terrain and obstacle data including a clearance factor; and
output an obstacle or terrain alert during the final descent based on any determined intersection.

16. The system of claim 10, wherein the program instructions are configured to cause the processor to:
determine a final descent flight path during final descent based at least on the VDP, the target acceptable glidepath angle, aircraft position and runway orientation;
determine any deviations outside of a defined acceptable range from the final descent flight path based on sensed aircraft position; and
output a deviation alert based on the deviations.

17. The system of claim 16, wherein the deviations include lateral and vertical deviations.

18. The system of claim 10, wherein the avionics database is a navigation and charts database, a runway awareness database or an airport mapping database.

* * * * *

UNITED STATES PATENT AND TRADEMARK OFFICE
CERTIFICATE OF CORRECTION

| | | |
|---|---|---|
| PATENT NO. | : 11,676,499 B2 | Page 1 of 1 |
| APPLICATION NO. | : 17/397423 | |
| DATED | : June 13, 2023 | |
| INVENTOR(S) | : Anil Kumar Songa, Kantha Chikkegowda and Suresh Bazawada | |

It is certified that error appears in the above-identified patent and that said Letters Patent is hereby corrected as shown below:

On the Title Page

In the Abstract, Line 1, "Decent" should be changed to -- Descent --

In the Claims

Column 16, Line 35 (Claim 1), "Decent" should be changed to -- Descent --
Column 17, Line 39 (Claim 10), "Decent" should be changed to -- Descent --

Signed and Sealed this
Thirtieth Day of April, 2024

Katherine Kelly Vidal
*Director of the United States Patent and Trademark Office*